(12) United States Patent
Zahemszky et al.

(10) Patent No.: US 10,069,595 B2
(45) Date of Patent: Sep. 4, 2018

(54) FORWARD ERROR CORRECTION IN CELLULAR NETWORKS

(71) Applicant: TELEFONAKTIEBOLAGET LM ERICSSON (PUBL), Stockholm (SE)

(72) Inventors: András Zahemszky, Sollentuna (SE); Lars Westberg, Enköping (SE); Szilveszter Nádas, Budapest (HU); Attila Mihály, Dunakeszi (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/513,040

(22) PCT Filed: Sep. 26, 2014

(86) PCT No.: PCT/SE2014/051125
§ 371 (c)(1),
(2) Date: Mar. 21, 2017

(87) PCT Pub. No.: WO2016/048209
PCT Pub. Date: Mar. 21, 2016

(65) Prior Publication Data
US 2017/0250782 A1 Aug. 31, 2017

(51) Int. Cl.
*H03M 13/00* (2006.01)
*H04L 1/00* (2006.01)
(Continued)

(52) U.S. Cl.
CPC .......... *H04L 1/0041* (2013.01); *H04L 1/0045* (2013.01); *H04L 1/0061* (2013.01);
(Continued)

(58) Field of Classification Search
CPC ..... H04L 1/0041; H04L 69/324; H04L 69/22; H04L 61/6022; H04W 84/042
See application file for complete search history.

(56) References Cited

U.S. PATENT DOCUMENTS

| 8,402,085 B2 | 3/2013 | McCanne et al. |
| 2005/0147040 A1* | 7/2005 | Vayanos ........... H03M 13/2707 370/235 |

(Continued)

FOREIGN PATENT DOCUMENTS

WO 2011/108904 A2 9/2011

OTHER PUBLICATIONS

Tobias Flach et al., Reducing Web Latency: the Virtue of Gentle Aggression, SIGCOMM'13, Aug. 12-16, 2013, Hong Kong, China, 12 pages.
(Continued)

*Primary Examiner* — Samir W Rizk
(74) *Attorney, Agent, or Firm* — Sage Patent Group

(57) ABSTRACT

It is disclosed a client node, a first network node, a second network node, and methods therefore, for enabling forward error correction, FEC, of data. In uplink, the client node is adapted to transmit a lightweight FEC packet, enabling to save radio resources. The first network node is adapted to calculate a payload for the FEC packet and to append the payload to a "lightweight" FEC packet, and to transmit the thus modified FEC packet to an endpoint of the uplink. In the downlink, the second network node may be adapted to determine whether a received FEC packet is redundant or not, and is adapted not to transmit it as is, to an endpoint client node, if the FEC packet is redundant, enabling saving radio resources.

20 Claims, 9 Drawing Sheets

(51) Int. Cl.
    *H04L 29/06*         (2006.01)
    *H04L 29/08*         (2006.01)
    *H04L 29/12*         (2006.01)
    *H04W 84/04*        (2009.01)

(52) U.S. Cl.
    CPC ............ *H04L 69/22* (2013.01); *H04L 69/324* (2013.01); *H04L 61/6022* (2013.01); *H04L 2001/0097* (2013.01); *H04W 84/042* (2013.01)

(56) References Cited

U.S. PATENT DOCUMENTS

2011/0225476 A1    9/2011   Thottan et al.
2012/0005549 A1    1/2012   Ichiki et al.

OTHER PUBLICATIONS

Mahesh Balakrishnan et al., Maelstrom: Transparent Error Correction for Lambda Networks, NSDI, 2008, 15 pages.
Jim Roskind, QUIC Quick UDP Internet Connections, Multiplexed Stream Transport Over UDP, Apr. 2012, 49 pages.
A. Begen, RTP Payload Format for 1-D Interleaved Parity Forward Error Correction (FEC), RFC 6015, Oct. 2010, 32 pages.
International Search Report from corresponding application PCT/SE2014/051125.

\* cited by examiner

FORWARD ERROR CORRECTION IN CELLULAR NETWORKS

TECHNICAL FIELD

This disclosure relates to forward error correction in cellular networks. In more particular, it relates to a client node and network nodes, and methods therein, for enabling forward error correction of data in cellular networks.

BACKGROUND

Packet-level forward error correction (FEC) is a known technique to improve object download times and good-put of connections by adding redundant packets to a packet stream. Forward error correction may be implemented in multiple layers of the communication stack, for instance in the application layer, transport layer, and/or link layer.

A high-level packet-level forward error correction architecture is shown on FIG. 1. The FEC-architecture contains two sides, a transmitter 12 side and a receiver 14 side. A FEC(n, r) scheme denotes that the sender sends n data packets, plus r redundant packets, in total n+r packets. The generated r redundant packets are some encoding of the p1, p2 . . . , pn original data packets. If during the transmission one or more data packets were lost, but some or redundant packets not, depending on the encoding scheme, the lost data packet(s) may be restored. Typically any n packets received out of the n+r total packets will result in correct recovery of all the encoded data packets.

In a basic case the encoding function is bitwise XOR, i.e. exclusive "OR", and r=1. This means that packets pi, where i=1, . . . , n, i.e. packets p1, . . . , pn are bitwise XOR-ed together to get a single redundant packet, which is then also sent towards the destination. If maximum one packet pi of p1, . . . , pn packets was lost, and the single redundant packet was not, the packet pi may be restored, by applying XOR function to the received packets.

One example of integrating FEC-functionality into the transport layer is QUIC (Quick user datagram protocol (UDP) Connections). In QUIC, it is possible to send redundant packets by combining the payload of the previous data packets belonging to one and the same FEC group. The packets hold FEC group information in the header, identifying which group they belong to; the sequence number of the first packet may be derived from this info. The last packet in the FEC group has a flag indicating that the packet contains redundant information, as well as the FEC group information to identify the group of packets it protects. If packet loss happened during the transmission, the receiver attempts to recover the lost payload from the redundant packet; if it is not possible, then it explicitly or implicitly asks for retransmission.

Another example is transmission control protocol (TCP)-Corrective, which computes the XOR of multiple maximum segment size (MSS)-sized segments and sends the MSS-sized repair segment along with the data stream towards the receiver. The receiver has the capability to detect if a packet was recovered so the TCP receiver may signal congestion and the TCP sender may reduce the congestion window.

QUIC as well as TCP-Corrective employ an end-to-end technique integrated into the transport layer, which means that a whole communication stream may be protected end-to-end with FEC between transmitter and receiver end-points. However, at some segments in the end-to-end connection, reliability may be achieved in different layers, for which reason transmitting FEC packets over a given segment may not be needed.

The main issue with QUIC and TCP-Corrective techniques is that they do not take into account the fact that some lower layers also implement reliability/redundancy/retransmission mechanisms, making the protection in higher layers redundant.

One example where protection in higher layers is redundant is long term evolution (LTE) radio access, where the radio link control (RLC) protocol over the radio link has an Acknowledged Mode, which ensures reliability by retransmission of lost/corrupted segments, making higher layer packet losses rare. In this case, transmitting the FEC-packet over the radio segment does not give any extra benefit, as there is another lower layer mechanism protecting against packet losses. As a consequence, the FEC-packet is transmitted in vain and the bandwidth of radio resources is effectively wasted. As the radio resource is often a scarce resource, the user-experienced performance of the network may become deteriorated.

There is hence a need for a solution addressing the issues as discussed above.

SUMMARY

It is an object of exemplary embodiments to address at least some of the issues outlined above, and this object and others are achieved by client nodes, network nodes and methods therein, according to the appended independent claims, and by the exemplary embodiments according to the dependent claims.

According to an aspect, the exemplary embodiments provide a method in a client node for enabling forward error correction (FEC) of uplink data. The method comprises generating a number of data packets, and transmitting towards an uplink network node, each data packet as it is generated. The method also comprises generating one FEC packet, and transmitting towards the uplink network node, only a header part of the FEC packet.

According to another aspect, the exemplary embodiments provide a method in a forward error correction capable network node for performing FEC of uplink data. The method comprises receiving from a client node a number of data packets, and transmitting, to an uplink network node, the received number of data packets. The method also comprises receiving, from the client node, only a header part of a FEC packet, and calculating a payload for the FEC packet, based on payload of the number of data packets. In addition, the method comprises appending the calculated payload, to the header part of the FEC packet, forming a modified FEC packet, and transmitting, to the uplink network node, the modified FEC packet.

According to yet another aspect, the exemplary embodiments provide a method in a forward error correction capable network node for performing FEC of downlink data. The method comprises receiving from an uplink network node, a first number of data packets, and forwarding to a client node, the first number of data packets. The method also comprises receiving from the uplink network node, a FEC packet having a payload based on a second number of data packets. The method further comprises notifying the client node that all data packets in the second number of data packets have been received from the uplink network node, if the first number of data packets comprises the same data packets as the second number of data packets. In addition, the method comprises transmitting to the client node the FEC packet if the second number of data packets comprises a data packet that is absent in the first number of data packets.

According to still yet another aspect, the exemplary embodiments provide a client node capable of enabling forward error correction of uplink data. The client node comprises a processing unit and a transmitter. The processing unit is adapted to generate a number of data packets. The processing unit is also adapted to transmit, towards an uplink network node, via the transmitter, each data as it is generated. The processing unit is further adapted to generate one FEC packet. In addition, the processing unit is also adapted to transmit towards the uplink network node, via the transmitter, only a header part of the FEC packet.

According to still yet another aspect, the exemplary embodiments provide a network node capable of performing FEC of uplink data. The network node comprises a receiver, a transmitter and a processing unit. The processing unit is adapted to receive, from a client node via the receiver a number of data packets, and to transmit, to an uplink network node via the transmitter, the received number of data packets. The network node is also adapted to receive from the client node, via the receiver, only a header part of a FEC packet. Further, the network node is also adapted to calculate a payload for the FEC packet, based on payload of the number of data packets. The network node is also adapted to append the calculated payload, to the header part of the FEC packet, forming a modified FEC packet. In addition, the network node is also adapted to transmit, to the uplink network node, via the transmitter, the modified FEC packet.

According to still yet another aspect, the exemplary embodiments provide a network node capable of performing FEC of downlink data. The network node comprises a receiver, a transmitter and a processing unit. The processing unit is adapted to receive, from an uplink network node, via the receiver, a first number of data packets. The processing unit is also adapted to forward, to a client node, via the transmitter, the first number of data packets. The processing unit of the network node capable of performing FEC of downlink data, is also adapted to receive, from the uplink network node, via the receiver, a FEC packet having a payload based on a second number of data packets. The processing unit is also adapted to notify the client node, via the transmitter, that all data packets in the second number of data packets have been received from the uplink network node, if the first number of data packets comprises the same data packets as the second number of data packets. In addition, the processing unit is also adapted to transmit, via the transmitter, the FEC packet to the client node, if the second number of data packets comprises a data packet that is absent in the first number of data packets.

The present disclosure provides a number of advantages.

Radio resources may be saved by avoiding sending a FEC packet, as is, over the radio interface, in uplink (UL) direction. Here, only a header part of the FEC packet is sent by the client node, which saves radio resources. In the downlink (DL), a FEC packet is only sent if it will be useful for the receiver, thereby also saving radio resources.

The transmitter or receiver, i.e. each endpoint of a data stream, may exclusively decide which data packets/streams to protect with FEC. This is advantageous as the endpoints know the best which data packets of a service are the most important, e.g. most delay sensitive based in the service used, to protect.

As endpoints may decide to only protect the most important streams, the overall extra traffic is kept low, which is a less aggressive behavior compared to approaches where a FEC encoder and decoder is put into the network and all traffic is protected between them regardless of priority; the delay and throughput penalty of the normal TCP flows competing on the same bottleneck is therefore kept low.

Each endpoint may decide the amount of FEC packets to use, which is an advantageous as the endpoints are aware of the experienced congestion on the whole end-to-end path and may tune an overhead accordingly.

The whole end-to-end path is protected with FEC, not only dedicated interfaces or segments of the end-to-end path.

The methods as disclosed herein introduce hardly any additional delay at all in forwarding data packets towards the receivers.

It is also an advantage that only a single network node is needed between the end-points of a connection, said single network node being independent from the endpoints.

BRIEF DESCRIPTION OF THE DRAWINGS

Embodiments will now be described in more detail, and with reference to the accompanying drawings, in which.

DETAILED DESCRIPTION

Figure 1:
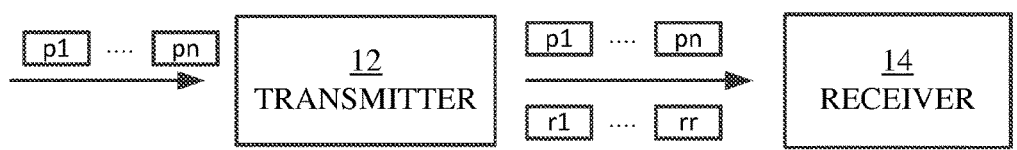
FIG. 1 schematically illustrates a packet-level forward error correction scheme according to prior art.

In the following description, different embodiments of the exemplary embodiments will be described in more detail, with reference to accompanying drawings. For the purpose of explanation and not limitation, specific details are set forth, such as particular examples and techniques in order to provide a thorough understanding.

A method is herein proposed for adding forward error correction (FEC) packets to a data stream in the UL. Another method is also proposed for removing redundant FEC packets from a stream of data packets in the DL.

A network node that is proposed herein is adapted to append a correct payload to a header part of FEC-packets in the uplink direction, for instance user equipment (UE) =>server, whenever it is instructed by a client node when receiving said header only FEC packet. An entity is also adapted to remove FEC-packets in the downlink direction, for instance server=>UE, whenever it detects that the FEC-packet is redundant, e.g. if all the data packets which the FEC packet relates to, were transmitted to the client node. How a FEC packet relates to data packets will be described in more detail hereinafter.

A FEC packet may be regarded as a repair packet, from which a missing or corrupt data packet may be derived.

In the scope of this disclosure, communicating end-points are assumed to use a FEC-capable protocol. One FEC capable network node is proposed to be placed on a path between a client node and an end-point network node or server. The scope of this disclosure relates to mechanisms of network nodes herein on the data plane.

The forward error correction and the proposed network nodes therefore, may be functional in various layers. However, a few requirements apply. If there is encryption of the flow of data packets between the two endpoints, FEC should be performed in the layer in which the encryption is performed, or the layer below. Also, for easy identification of FEC packets and calculating XORs on the payload, it is useful that the data packets and FEC packets are not segmented further.

This disclosure proposes a feature for transport protocols comprising enhanced versions of transfer control protocol (TCP), Quick user datagram protocol Internet connections (QUIC), or stream control transmission protocol (SCTP) over datagram transport layer security (DTLS).

This disclosure adds a few requirements for the transport protocol; also described in more detail below:

Support for Forward Error Correction;
The network node between endpoints should be adapted to tell if a received packet is a FEC packet;
Processing of and using FEC information should be performed on encrypted payload;
Possibility in the end-points to construct "lightweight" or "header part only" FEC packets;
Dropping of DL FEC packets in the network node should not trigger congestion control actions in any endpoint.

This disclosure proposes a method in endpoints as well as in the intermediate entity between, for instance, a client node and a server. The methods as herein presented are agnostic to the exact encoding/decoding algorithm. One common encoding is to use XOR coding, where exactly one packet loss may be recovered from a group of packets. Throughout this disclosure, XOR encoding is used as an example encoding.

Forward Error Correction Method in Uplink Direction

In a state of the art end-to-end FEC mechanism integrated into the transport layer, client nodes generate redundant repair packets. In contrast to this, in this disclosure the client node is not adapted to send complete repair packets but only a repair packet with transport layer header and empty payload. The transport layer header is filled as if the packet would contain FEC information in the payload.

A network node situated between the client node and for instance, a server, understands the transport layer header and notices when an empty FEC-packet is received. All other transport layer data packets or segments are forwarded towards the destination untouched. They may also be copied in a memory of the network node for further reference. When a FEC-packet is received, the network node may calculate the payload of the FEC-packet by applying a method on previously saved payloads; as an optimization, a running XOR of the previously received encrypted payloads may be maintained. The network node may then fill the payload part of the FEC packet, while leaving the header part of the FEC packet untouched and forwards said FEC packet towards the destination.

Figure 2:
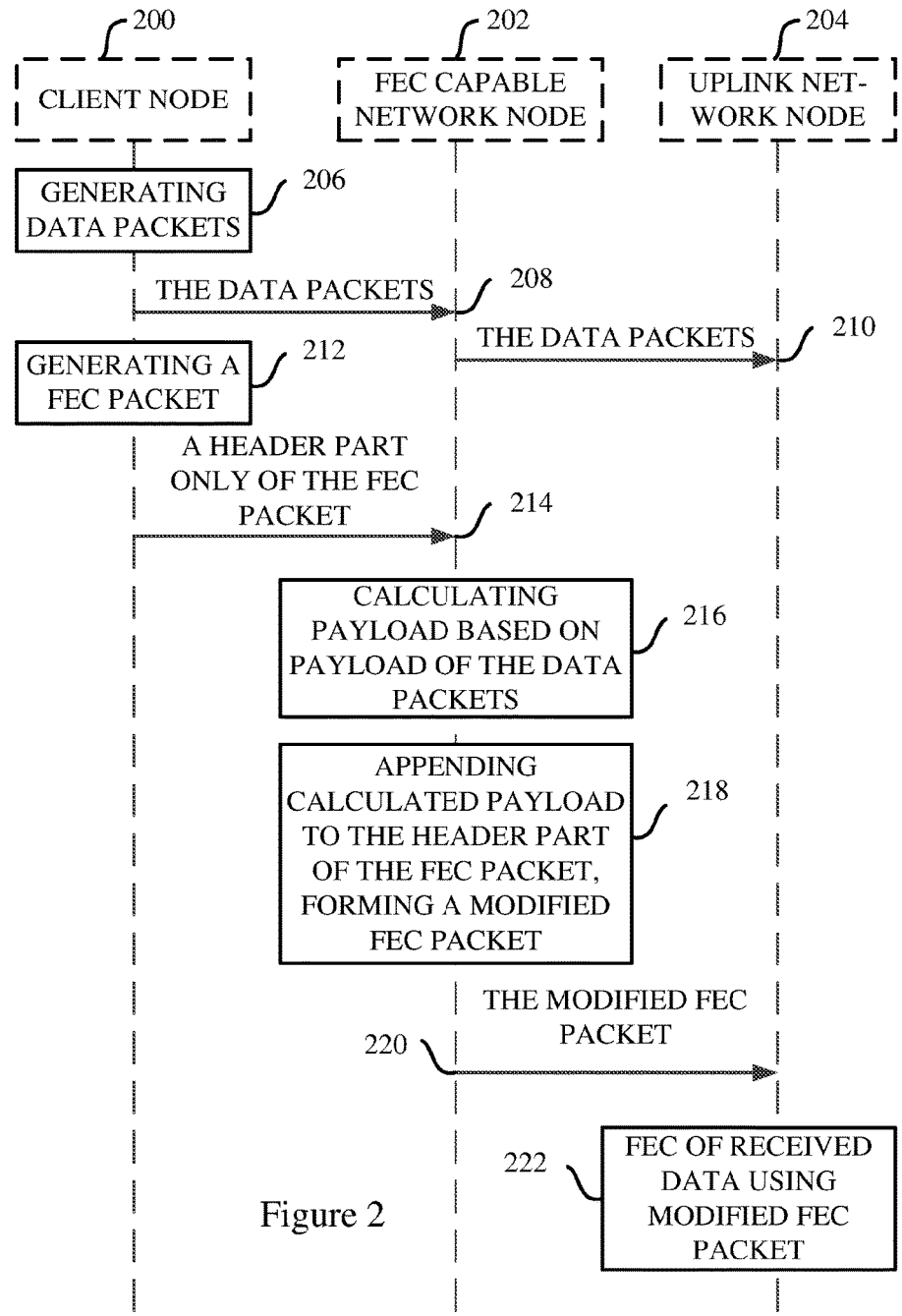
FIG. 2 presents a handshake diagram of signaling in the uplink, according to exemplary embodiments.

FIG. 2 presents a handshake diagram of signaling between a client node 200 capable of enabling FEC of uplink data, a FEC capable network node 202 and an uplink network node 204.

In 206, the client node 200 generates a number of data packets. In 208, the client node transmits said number of data packet towards the FEC capable network node 202. In 210, the FEC capable network node 202 sends the data packets to the uplink network node 204. When the client node decides that a FEC packet shall be sent, the client node 200 generates, in 212, one FEC packet, and fills the header part, for instance according to checksums of the transmitted number of data packets or to security purposes. The XOR of encrypted payloads of the number of data packets may be needed to fill the header part of the FEC packet.

In 214, a header part only of the FEC packet is transmitted towards the FEC capable network node 202. Herein, only a, so called, "lightweight" FEC packet is transmitted, i.e. a FEC packet without a payload is transmitted.

Transmission of the header part only, performed in 214, may be based on a configuration, for instance, every 5-10 data packets, after a timer expiration, after a drop of a TCP packet or a detected round trip time (RTT)>a RTT threshold.

The FEC capable network node 202 receives the header part of the FEC packet as transmitted in 214. In 216, the FEC capable network node 202 calculates a payload based on the payload of the number of data packets received in 208.

The payload may be created by performing an XOR-operation on the encrypted payload of the number of data packets as received in 208, as the clear-text payload is not readable by the FEC capable network node 202. In the case the payload of the number of data packets, as received in 208, is not encrypted end-to-end, then the XOR-operation is performed on the clear-text payload.

The FEC capable network node 202, when receiving a data packet that belongs to a FEC group, that is a group of data packets that is protected with the same FEC packet, may make a copy of the payload for further reference. Alternatively, the FEC capable network node may maintain a running XOR-operation of the encrypted payload of the corresponding data packets without the requirement to store them.

Thus, when the FEC capable network node 202 receives the header part only (or "lightweight") FEC packet, the FEC capable network node 202 may calculate the payload by performing an XOR-operation of the data packets belonging to the corresponding FEC group, here the number of data packets, or alternatively reading the payload from a corresponding running XOR that is being calculated.

In 218, the FEC capable network node 202 may then append the calculated payload to the header part of the FEC packet, forming a modified FEC packet.

In 220, the FEC capable network node 202 may transmit the modified FEC packet towards an uplink network node 204, being a destination of the data packets.

In 222, the uplink network node 204 may then perform recovering a data packet using the received modified FEC packet, if needed. This step of performing packet recovery based on FEC in the uplink network node 204 in the UL where the uplink network node corresponds to a server, is well known and will therefore not be described further.

Figure 3:
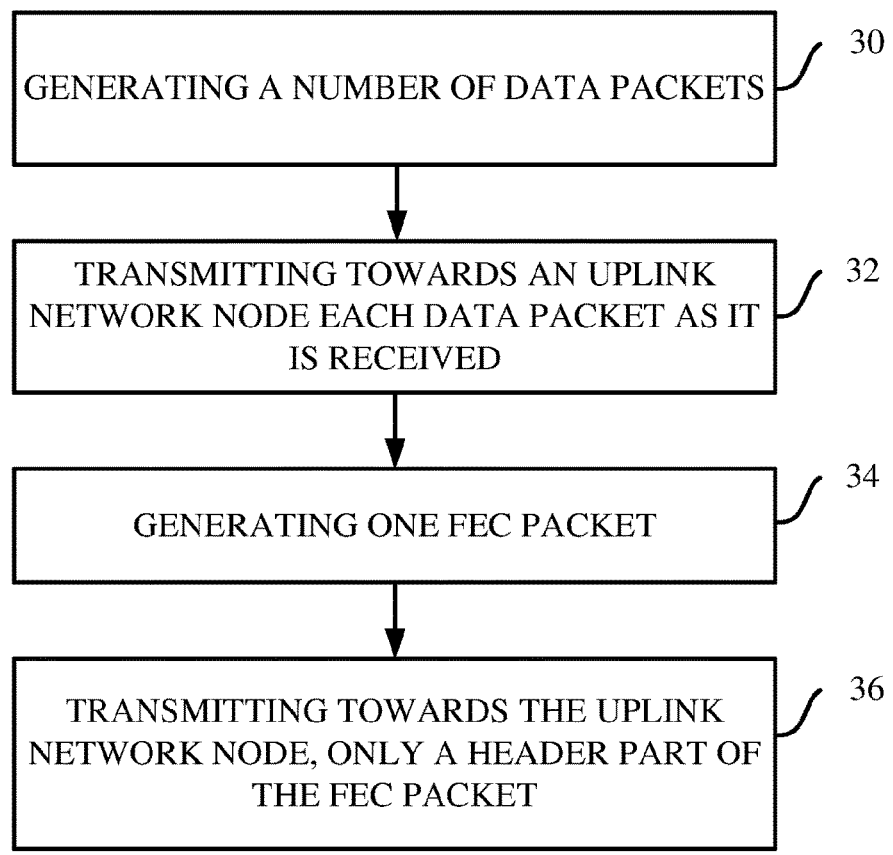
FIG. 3 illustrates a flowchart of a method of a client node in the uplink, according to exemplary embodiments.

FIG. 3 illustrates a flowchart of a method in a client node for enabling FEC of uplink data. The method comprises generating 30 a number of data packets, and transmitting 32, towards an uplink network node 202 each data packet as it is generated. Generating 30 a number of data packets and transmitting 32 towards the uplink network node, corresponds to generating 206 data packets and transmitting 208 the data packets, respectively, of FIG. 2. The method also comprises generating 34 one FEC packet, corresponding to generating 212 of FIG. 2, and transmitting 36, towards the uplink network node 202, only a header part of the FEC packet, corresponding to transmitting 214 a header part only of the FEC packet.

Transmitting 36 only the header part of the FEC packet, may comprise transmitting it at a point in time after which a configurable number of data packets has been transmitted.

Generating 30 the number of data packets may comprise generating a message authentication code (MAC) of the FEC packet based on the payload of the generated number of data packets, and including the MAC in the header of the FEC packet.

The payload of a FEC packet may thus be authenticated by using the MAC in a header part of the FEC packet. By checking it, a receiver receiving the FEC packet may verify the integrity of the FEC packet. The MAC may essentially be a hash function of the payload. Thus, in the uplink a transmitter, i.e. a client node, may be configured to calculate FEC information even if the client node will not add the calculated information into the header part, in order to calculate a correct hash value to be included in the header part. When the receiver, towards which the client node sent the FEC packet, receives the FEC packet, it may verify that a network node positioned on the path from the client node to the receiving network node, i.e. intermediate FEC capable network node, appended the correct payload to the header part of the FEC packet. This may be performed by comparing the hash value of the header part with the hash value calculated based on the payload of the FEC packet. If the two hash values are not the same, the payload is incorrect, and the FEC packet is dropped by said receiver.

Transmitting 32 said each data packet, may comprise transmitting said each data packet, via a radio access network node towards the uplink network node.

Transmitting 36 said only a header of the FEC packet, may comprise transmitting said only a header of the FEC packet, via a radio access network node towards the uplink network node.

Figure 4:
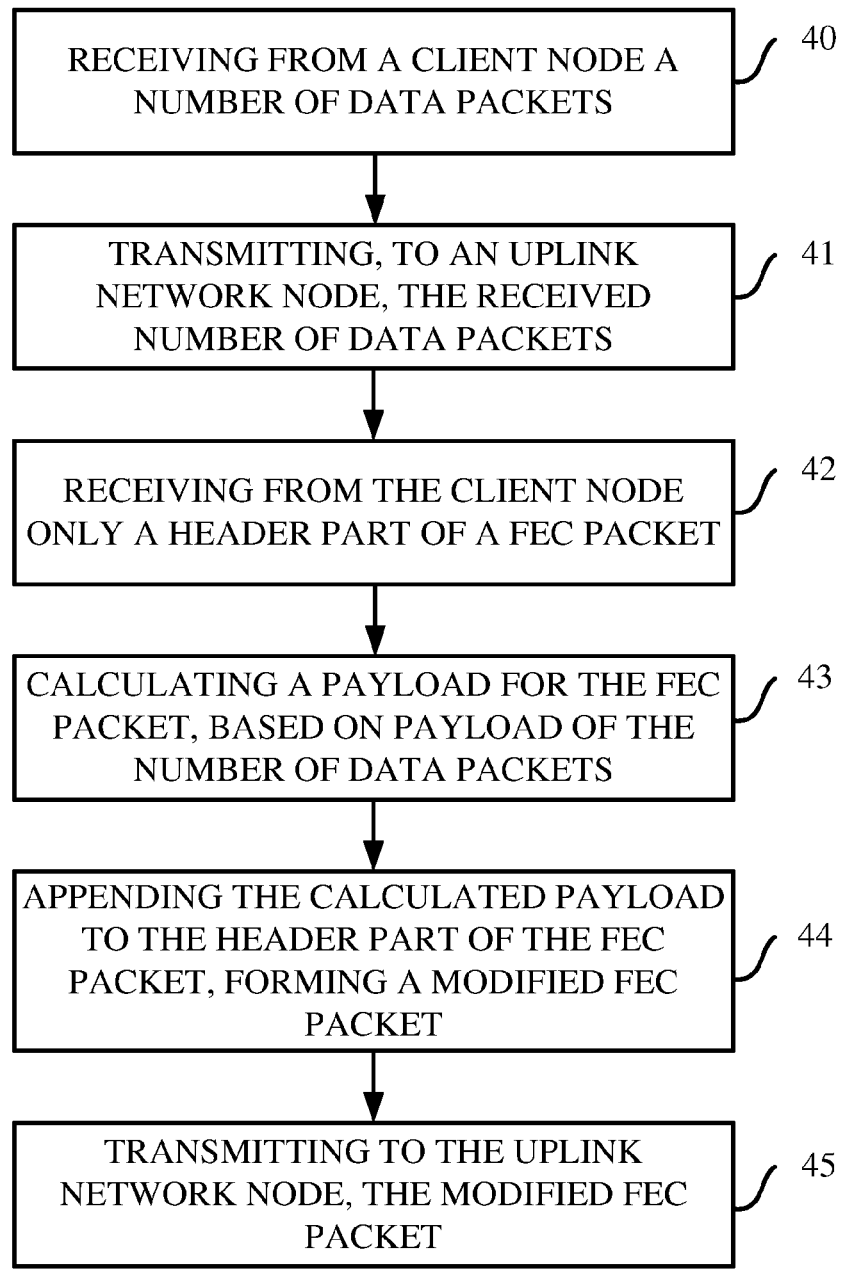
FIG. 4 illustrates a flowchart of a method of a network node in the uplink, according to exemplary embodiments.

FIG. 4 illustrates a flowchart of a method in a forward error correction capable network node 202, of FIG. 2, for performing FEC of uplink data. The method comprises receiving 40 from a client node 200 a number of data packets, and transmitting 41, to an uplink network node 204, the received number of data packets. The method also comprises receiving 42, from the client node 200, only a header part of a FEC packet, and calculating 43 a payload for the FEC packet, based on payload of the number of data packets. In addition, the method comprises appending 44 the calculated payload, to the header part of the FEC packet, forming a modified FEC packet, and transmitting 45, to the uplink network node 204, the modified FEC packet.

Calculating 43 the payload for the FEC packet, may comprise performing an XOR-operation on the payload of the received number of data packets.

Figure 5:
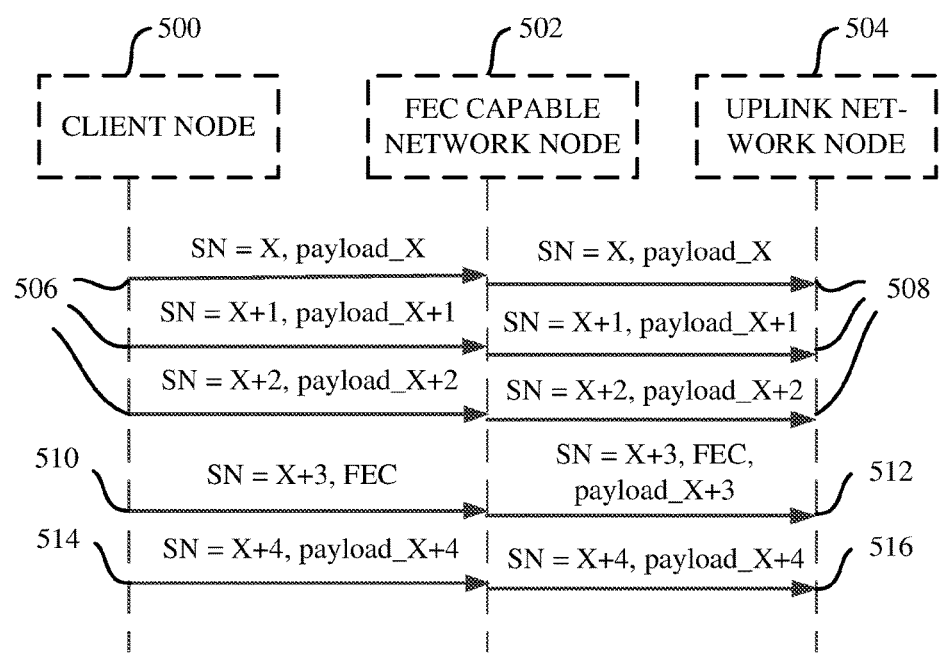
FIG. 5 illustrates a packet sequence diagram in the uplink, related to an exemplary embodiment.

FIG. 5 illustrates a packet sequence diagram in the uplink, related to an exemplary embodiment, between a client node 500, a FEC capable network node 502 and an uplink network node 504.

It is noted that the client node 500, the FEC capable network node 502 and the uplink network node 504, correspond to the client node 200, the FEC capable network node 202, and the uplink network node 204, respectively, of FIG. 2. Each data packet comprises a sequence number (SN) in the header part and a payload.

In 506, three consecutive data packets are transmitted by the client node 500 towards the FEC capable network node 502. These have SN=X, X+1, and X+2, respectively, as well as a payload as payload_X, payload_X+1, and payload_X+2, respectively.

In 508, the data packets having SN=X, X+1 and X+2, respectively, are forwarded to the uplink network node 504.

In 510, the client node 500 transmits a header part only or "light weight" FEC packet, having a consecutive sequence number, SN=X+3.

The receipt of the header only FEC packet by the FEC capable network node 502, may trigger calculation of a payload for the FEC packet. Herein the calculation may be performed as follows:

$$\text{Payload\_}X+3 = (\text{payload\_}X)\text{XOR}(\text{payload\_}X+1)\text{XOR}(\text{payload\_}X+2)$$

The FEC capable network node 502 may then append the calculated payload to the header part only FEC packet, creating a modified FEC packet. It may then transmit, in 512, the modified FEC packet denoted SN=X+3, FEC, payload_X+3, to the uplink network node 504.

In 514, the client node transmits a further data packet having SN=X+4, and a payload as payload_X+4, to the FEC capable network node 502 that after receipt forwards the data packet SN=X+4, payload_X+4 to the uplink network node 504, in 516.

It is noted that data packets SN=X, X+1, and X+2 are protected by the FEC packet SN=X+3. Data packet SN=X+4 is not protected by FEC packet SN=X+3, but may rather be protected by another FEC packet yet to be created.

Usually, there is no data packet loss in a typical scenario in the uplink direction between the client node 500 and the FEC capable network entity 502, due to reliability mechanisms in the lower layers, typically RLC in Acknowledgement Mode. However, the FEC capable network node 502 may run additional mechanisms to prepare for the case in which a data packet is lost. Below is described the additional mechanisms in the case a data packet is lost. By maintaining the sequence numbers received, the FEC capable network node 502 may determine whether all the corresponding data packets was received that need to be XORed together, enabling it to construct the correct FEC packet. If the FEC capable network node 502 has not received all the data packets needed to calculate the FEC or repair packet, it may start a timer set to a few milliseconds to wait for missing data packet(s). It is noted that this may in the general case happen due to packet loss or re-ordering, but this is unlikely in the typical scenario.

If at least one of the data packets is still missing after the timer expired, it means that the FEC capable network node 502 cannot calculate the FEC packet. In this case, it should discard the lightweight FEC packet to avoid an erroneous operation in the receiver end. In addition, it should notify the client node 500 about the packet loss, to enable the client node to immediately re-send the data packet. When the re-sent data packet arrives to the FEC capable network node 502, the FEC capable network node 502 may then calculate the correct payload of a protecting FEC packet, and then forward a modified FEC packet towards the uplink network node 504, being the destination. In another embodiment, the usage of the timer is not necessary, and the FEC capable network node 502 may start to the above-mentioned mechanism immediately after a header part only or "lightweight" FEC packet is received by the FEC capable network node 502.

The receiver end, i.e. the uplink network node 504, receives data packets and corresponding FEC packets. If the uplink network node 504 detects a data packet loss it may re-generate the lost data packet from a corresponding FEC-packet, assuming that only one data packet was lost. As the FEC capable 502 calculated the redundant information, i.e. the payload of the FEC packet, on the encrypted payload of data packets, it is important the uplink network node 504 receiving the data packets and a FEC packet, performs recovering the lost data packet before decrypting the payload of the FEC packet.

If end-to-end encryption between the endpoints is used in the uplink, the FEC capable network node 204, 502 has to calculate the FEC information based on encrypted payload of the data packets which the FEC packets protects.

This also means that if the payload is authenticated, the client node 200, 500 has to compute the MAC information on the encrypted payload. Furthermore, if there was a data packet loss that the receiving endpoint, i.e. the uplink network node 204, 504 will recover with the use of a FEC packet, it needs to XOR the encrypted payloads and the content of the FEC packet, and perform the decryption afterwards.

The uplink network node 504 has to make sure that the FEC capable network node 502 filled the payload, by appending the calculated payload to the header only part of the FEC packet, correctly. This may be done by checking e.g. checksums, or other security related values that the client node may have put in the header only or "lightweight" FEC-packet, knowing what payload the intermediate FEC-entity or FEC capable network node, will insert into the FEC packet. If the checksum does not match, the uplink network node 504 may drop the FEC-packet and cannot use it for recovering lost data packets.

Forward Error Correction Method in Downlink Direction

In the downlink direction, the role of the FEC capable network node is different than in the uplink direction. Instead of generating repair packets, the aim of the FEC capable network node is to remove those repair packets that are not necessary to forward to the client node. To achieve this, the FEC capable network node may keep track of the received data packets belonging to the end-to-end connection by maintaining a list of some kind of packet identifications. The data packets are again forwarded unmodified but now towards the client node.

When a repair packet, or FEC packet, is received, the FEC capable network node checks whether the FEC packet is redundant or not; if it detects that all the corresponding data packets were forwarded to the client node, the repair or FEC packet is redundant as there is no packet loss to recover from. The repair packet is also redundant if too many data packets were lost from the corresponding FEC-group(s), meaning the FEC packet cannot be used to recover any lost packets. Checking the packet losses may be performed by maintaining the received and forwarded sequence numbers (SNs).

According to some embodiments, the repair or FEC packet may simply be discarded. However, it is still useful to notify the end-point being a client node that the FEC packet was intentionally dropped, and not due to congestion. A transport layer sender end-point node being the server would else react by reducing a congestion window after the transport layer client node has detected and informed the server about a packet loss.

Figure 6:
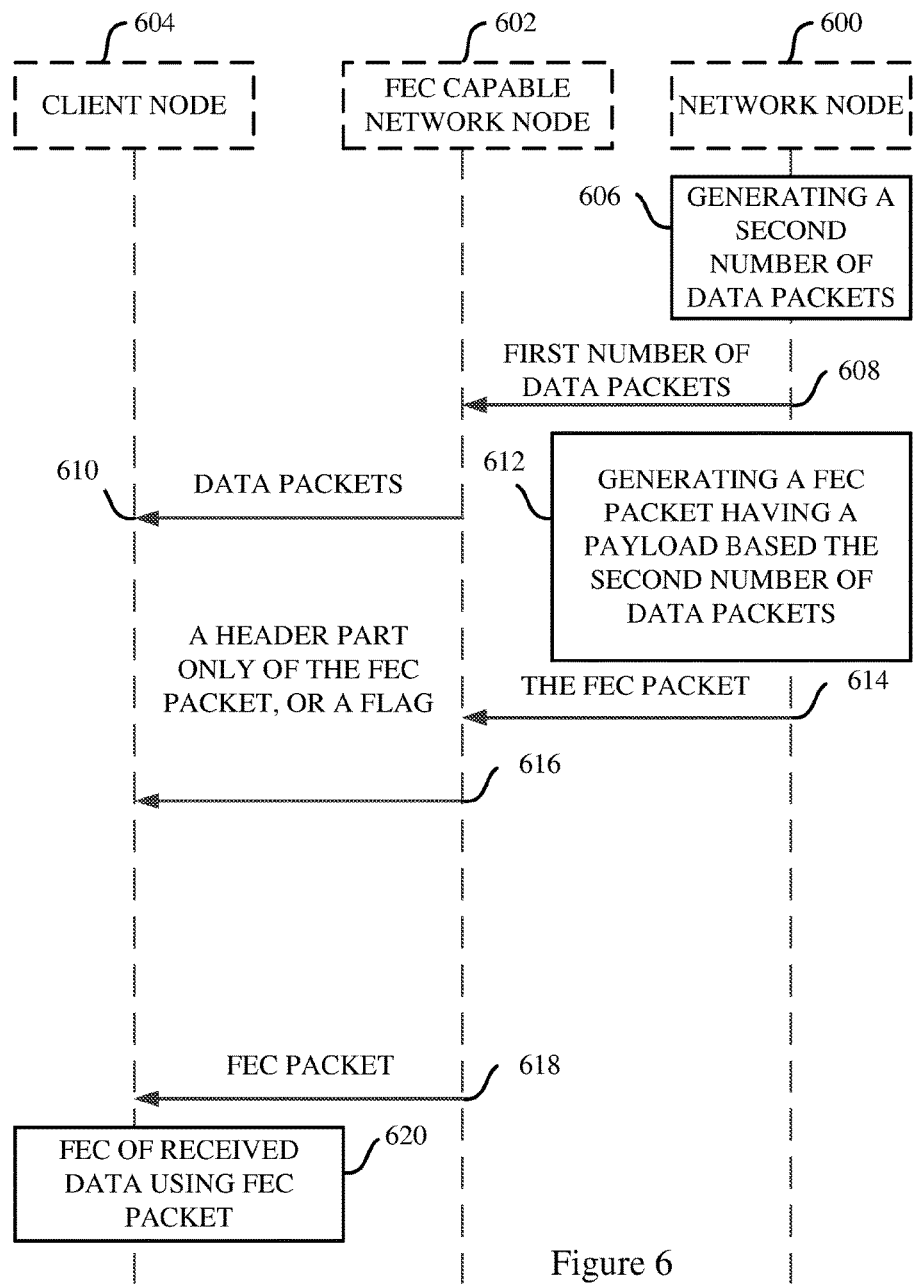
FIG. 6 presents a handshake diagram of signaling in the downlink, according to exemplary embodiments.

FIG. 6 presents a handshake diagram of signaling between a network node 600, a FEC capable network node 602 and a client node 604.

In 606, the network node 600 generates a second number of data packets. The network node 600 attempts to transmit the generated second number of data packets towards the FEC capable network node 602. However, in 608, a first number only of the data packets is successfully transmitted to, and received by the FEC capable network node 602. When the FEC capable network node 602 receives data packets of the first number of data packets, it may store a sequence number as comprised in the header part of each data packet. In 610, the FEC capable network node forwards the first number of data packets to the client node 604 unmodified.

In 612, the network node generates a FEC packet having a payload based on the second number of data packets. More precisely, the payload of the FEC is based on the payload of the second number of data packets.

The number of data packet transmitted in 608, may be regarded as the number of data packet successfully transmitted from the network node 600 to the FEC capable network node 602.

The second number of data packet may thus denote the number of data packet which the network node 600 attempts to transmit.

The first number of data packets may be the same group of data packets as the second number of data packets. The second number of data packets may alternatively include one data packet that is absent in the first number of data packets.

In 614, the network node 600 transmits the FEC packet to the FEC capable network node 602.

When a FEC packet is received by the FEC capable network node, it may determine whether the received FEC packet is redundant or not. The FEC packet is redundant if all data packets which the FEC packet protects have been received by the FEC capable network node, or if more than one data packet was lost between the network node 600 and the FEC capable network node 602. It is here assumed that XOR coding that may recover only a single data packet loss per each FEC packet.

Due to packet re-ordering, missing data packets may subsequently arrive at the FEC capable network node 602. The FEC capable network node may start a timer and await a missing data packet. If the missing data packet arrives before the timer expires, the FEC packet becomes redundant.

In 616, the FEC capable network node 602 transmits a header part only of the FEC packet as received in 614, or alternatively a flag in a header part of a data packet, if the data packets in the first number of data packets correspond to all data packets in the second number of data packets, i.e. if all data packets have been received by the FEC capable network node. When the client node 604 is notified that all data packets have been received by the FEC capable network node 602, by sending a flag in a header part of a data packet, the received FEC packet may thus be discarded.

Slightly rephrased, a header part only of the FEC packet or a flag of a data packet is transmitted by the FEC capable network node, if all data packets sent by the network node 600 are received by the FEC capable network node 602.

In 618, the FEC capable network node 602 transmits the FEC packet to the client node 604, if the second number of data packets comprises a data packet that is absent in the first number of data packets. It may again be noted that the FEC packet may only recover a single data packet loss, if XOR encoding is used for the payload of the FEC packet. In the case XOR encoding is used, the FEC packet is transmitted if there is only one data packet missing in the first number of data packets, as compared with the second number of data packets.

Slight rephrased, the FEC capable network node 602 transmits the FEC packet, if the first number of data packets lacks a data packet of the second number of data packet.

In 620, the client node 604 may perform a FEC of the received data packets using the FEC packet as received in 618.

If only a single data packet is missing in the first number of data packets, as compared with the second number of data packets, either when the FEC packet is received by the FEC capable network node 602 or during the time period when a timer may be running, the FEC packet is considered not to be redundant and it is hence transmitted to the client node.

However, if the missing data packet subsequently arrives, the received data packet may itself become redundant, as the FEC packet was transmitted to the client node 604 and used in the client node to recover the missing data packet. The FEC capable network node may store the sequence number of a missing data packet, when transmitting the FEC packet to the client node for repairing the data, enabling the FEC capable network node to discard the missing data packet if it is subsequently received.

If a FEC-packet was redundant and FEC packet was intentionally dropped, the FEC capable network node shall notify the client node end-point that the drop was in fact intentional and not due to congestion. This has the effect that dropping of a FEC packet in the FEC capable network node does not trigger congestion control actions in the sending endpoint.

Notifying the client node 604 may be performed by transmitting a separate control message, which may be only a few bytes long, to the client node 604; or may be signaled by the FEC capable network node in the subsequent data packet by setting a specific flag in the packet header of said data packet. As another alternative, the network node 600 may be configured such that if the client node 604 misses a FEC packet, it shall not take this as an input for a congestion control algorithm.

As mentioned above, instead of dropping a redundant FEC packet, the FEC capable network node may instead send a heard part only of the FEC, by for instance replacing the FEC packet with a "lightweight" FEC packet, i.e. removing its payload and transmit the header part only FEC packet to the client node 604.

By such a measure, the client node 604 receives the FEC packet, let be lightweight, and will not trigger any congestion control action, as there was no missing packet in communication between the network node 600 and the FEC capable network node 602.

Also this is advantageous when a "protected path", being a potential network bottleneck, is in the middle of the endpoint-to-endpoint path. The FEC packet could else have to be re-generated at the other end of the protected path.

There is yet another way to notify the client node about that a FEC packet is redundant and consequently discarded in the FEC capable network node. The FEC capable network node may be aware of what data packets belong together in one FEC group, i.e. protected with the same FEC packet. When the last of these data packet is received, and all other data packets of the group has been received, the FEC capable network node 602 may mark one specific bit, such as setting a flag, in this last data packet, by means of which the FEC capable network node 602 notifies that it drop the coming FEC packet, as it is redundant. Subsequently, after receiving the FEC packet, the FEC capable network 602 may hence drops it, as a usual mode of operation.

Figure 7:
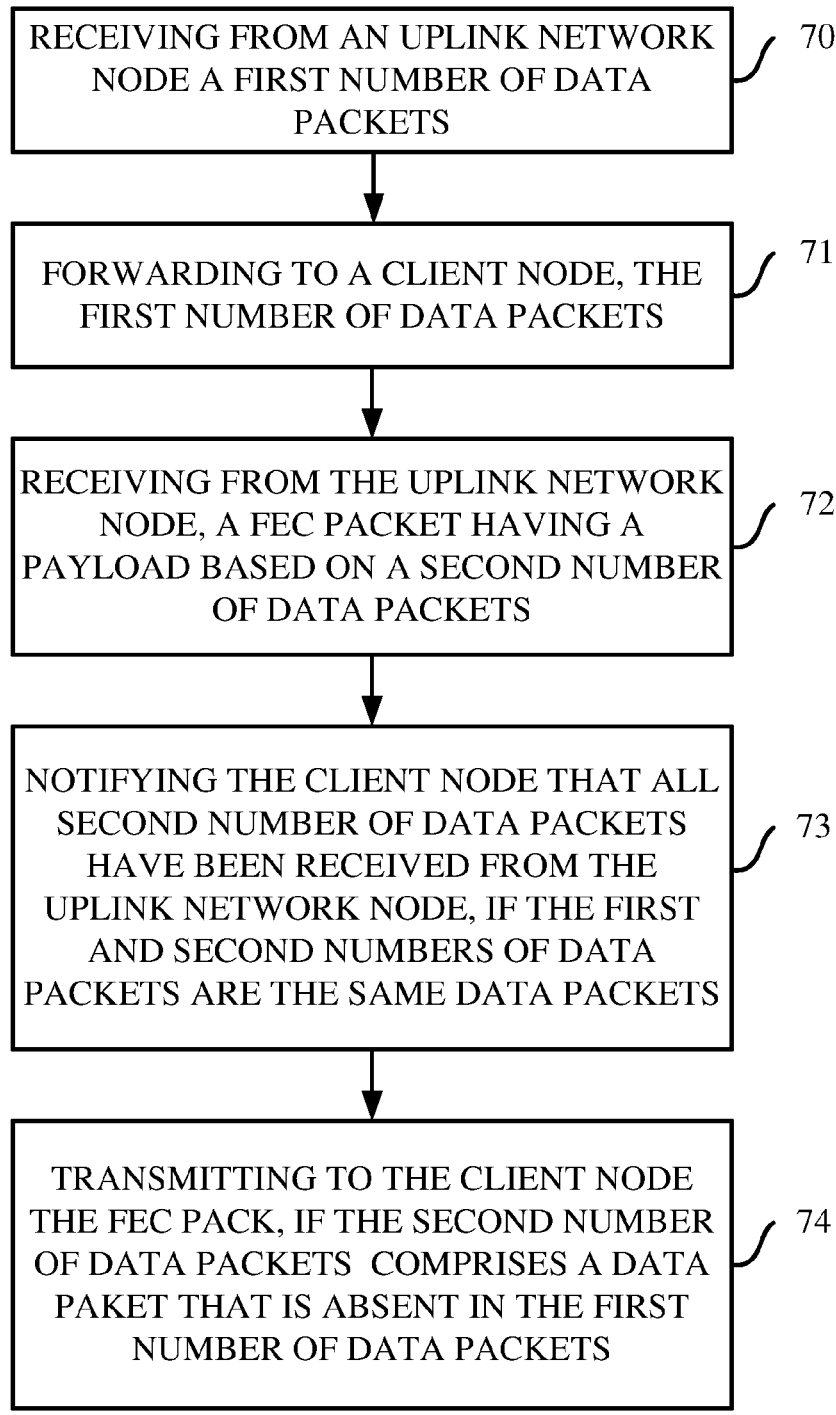
FIG. 7 illustrates a flowchart of a method of a network node in the downlink, according to exemplary embodiments.

FIG. 7 illustrates a flowchart of a method in a forward error correction capable network node 602 for performing FEC of downlink data. The method comprises receiving 70, 608 from an uplink network node, a first number of data packets, and forwarding 71, 610, to a client node, the first number of data packets. The method also comprises receiving 72, 614, from the uplink network node 600, a FEC packet having a payload based on a second number of data packets. The method further comprises notifying 73, 616 the client node 604 that all data packets in the second number of data packets have been received from the uplink network node, if the first number of data packets comprises the same data packets as the second number of data packets, i.e. that the first and the second numbers of data packets are the same data packet. In addition, the method comprises transmitting 74, 618 to the client node 604 the FEC packet, if the second number of data packets comprises a data packet that is absent in the first number of data packets.

Notifying 73, 616 the client node 604 may comprise transmitting 616 to the client node 604 only a header part of said FEC packet indicating that the data packets of the second number of data packets were received by the FEC capable network node.

Notifying 73, 616 the client node 604 may comprise notifying 73, 616 the client node 604 by a certain flag in a header part of a data packet that is forwarded to the client node, indicating that the data packets of the second number of data packets were received by the FEC capable network node.

Notifying 73, 616 the client node 604 may comprise including the certain flag in the header part of one of the data packets of the first number of data packets which are forwarded to the client node.

The method in a forward error correction capable network node 602 for performing FEC of downlink data, may comprise receiving, from the uplink network node 600, another data packet, and wherein notifying 73, 616 the client node may comprise including the certain flag in a header part of said another data packet, and forwarding said another data packet to the client node 604.

The method in a forward error correction capable network node 602 for performing FEC of downlink data, may comprise identifying the data packets comprised in the second number of data packets, based on a header part of the received FEC packet.

Figure 8:
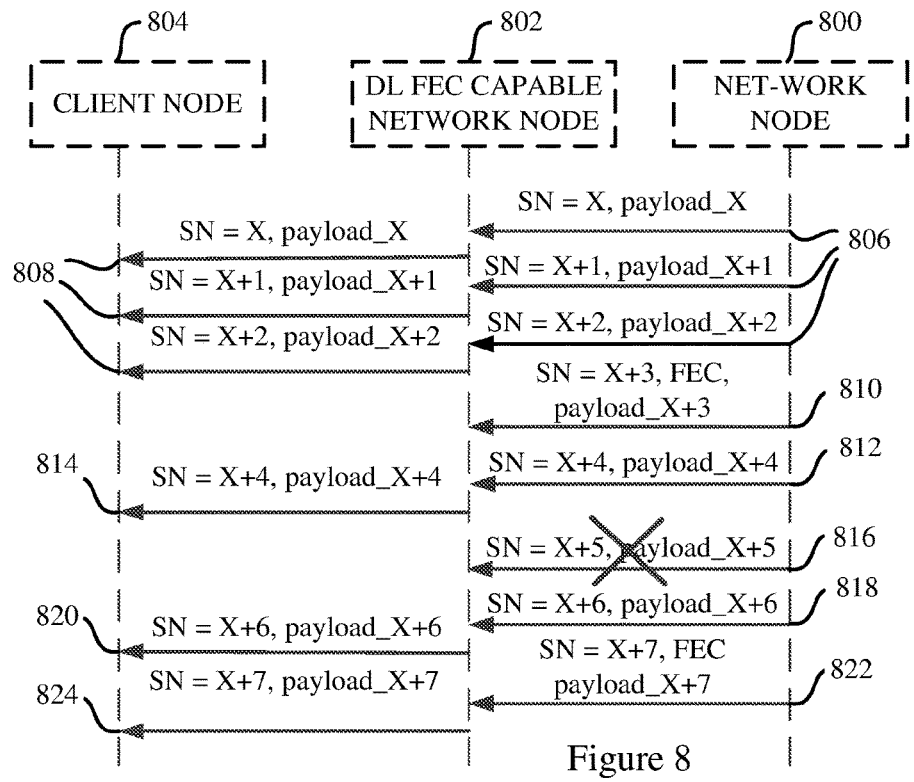
FIG. 8 illustrates a packet sequence diagram in the downlink, related to an exemplary embodiment.

FIG. 8 illustrates a packet sequence diagram in the downlink, related to an embodiment of the exemplary embodiments, between a network node 800, a DL FEC capable network node 802 and a client node 804.

Each data packet typically comprises a sequence number (SN) in the header part and a payload.

In 806, three consecutive data packets are transmitted by the network node 800 towards the DL FEC capable network node 802. These have SN=X, X+1, and X+2, respectively, as well as a payload as payload_X, payload_X+1, and payload_X+2, respectively.

In 808, the data packets having SN=X, X+1 and X+2, respectively, are forwarded to the client node 804.

In 810, the network node 800 transmits a FEC packet, having a consecutive sequence number, SN=X+3, and having a payload based on the payload of the data packets of 806 having SN=X, X+1 and X+2.

As the FEC capable network node 802 has already received all data packets X, X+1 and X+2, which the FEC packet protects, said FEC packet is redundant, for which reason the FEC packet does not need to be forwarded to the client node 804.

In 812 a data packet having SN=X+4 is transmitted by the network node 800 to the FEC capable network node 802, which data packet is protected by a FEC packet to be transmitted. In 814, said data packet having SN=X+4 is forwarded to the client node 804.

In 816, the network node 800 transmits a data packet having SN=X+5 towards the FEC capable network node 802. However, this data packet is not successfully transmitted and will be missed in the FEC capable network node 802.

In 818, a subsequent data packet having SN=X+6 is transmitted by the network node 800 and is successfully received by the FEC capable network node 802. In 820, it is then forwarded to the client node 804.

Then, in 822, the network node 800 transmits a FEC packet having SN=X+7 and a payload based on the payload of data packet transmitted in 812, 816 and 818, i.e. the data packets having SN=X+4, X+5 and X+6. The FEC capable network node 802, determines that this FEC packet having SN=X+7 is not redundant as data packet SN=X+5 was not received by the FEC capable network node 802. Since it is not redundant it is forwarded in 824 to the client node 804, enabling the client node to recover the missing data packet having SN=X+5.

Figure 9:
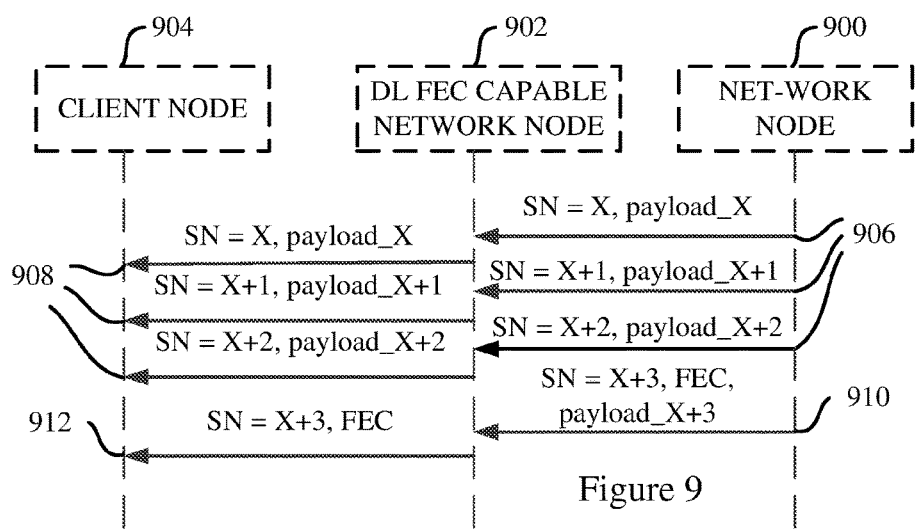
FIG. 9 illustrates a packet sequence diagram in the downlink, related to an exemplary embodiment.

FIG. 9 illustrates a packet sequence diagram in the downlink, related to an embodiment of the exemplary embodiments, between a network node 900, a DL FEC capable network node 902 and a client node 904.

In 906, three consecutive data packets are transmitted by the network node 900 towards the DL FEC capable network node 902. These have SN=X, X+1, and X+2, respectively, as well as a payload as payload_X, payload_X+1, and payload_X+2, respectively.

In 908, the data packets having SN=X, X+1 and X+2, respectively, are forwarded to the client node 904.

In 910, the network node 900 transmits a FEC packet, having a consecutive sequence number, SN=X+3, and having a payload based on the payload of the data packets of 906 having SN=X, X+1 and X+2.

The FEC capable network node 902 thus receives the FEC packet.

As the FEC capable network node 902 has already received all data packets X, X+1 and X+2, which the FEC packet protects, said FEC packet is redundant, for which reason the unmodified FEC packet does not need to be forwarded to the client node 804.

However, the FEC capable network node 902, notifies the client node 904 that all data packets, i.e. the data packets having a SN=X, X+1 and X+2, are received, as well as a FEC packet 910 has been generated and transmitted by network node 900 and received by the FEC capable network node 902. This is performed by transmitting, in 912, a modified FEC packet having a header part only, and having SN=X+3, to the client node 904.

In 912, a so called "lightweight" FEC packet is hence transmitted, as data packets have been received by the FEC capable network node 902, in beforehand.

By forwarding a header part only, or "lightweight" FEC packet from the FEC capable network node to the client node, over a radio interface less radio resources are consumed. Also, by forwarding the header part only FEC packet to the client node 904, it will not trigger congestion control actions in the network node 904, since no packet will be considered to be missing.

According to an embodiment, the FEC capable network node 802, 902 maintains the SN of the received data packets in a first list. The SN of redundant data packets, i.e. those that came out out-of-order and likely to have been recovered in the receiver, or client node, via a FEC packet, may be maintained in second list.

When the FEC capable network node receives packet, it determines whether the packet is a data packet or a repair packet, in the form of a FEC packet. If it is a FEC packet, the FEC capable network node may check whether the FEC packet is redundant by checking the SNs in the first list to determine whether all data packets which the FEC packet protects are received. If it is redundant, i.e. all data packets that the FEC packet protects are received, the first list of SNs is cleared. As described above, the FEC packet may then be discarded, or alternatively a header only FEC packet may be transmitted to the client node, notifying that all data packets were received by the FEC capable network node.

If the FEC packet is not redundant, the FEC capable network node may update information about redundant data packets. The FEC capable network node may hence add the SNs of missing data packets, which are covered by a just received FEC packet, to the second list. As missing data packets are received by the FEC capable network node, the SNs of these data packets will be cleared from said second list. The missing data packets may be forwarded to the client node until there is only one SN of a missing data packet in the second list. Then the second list may be cleared, for the reason that the last data packet will be redundant since it may be recovered by the FEC packet by which it is protected. When the FEC packet, is received by the FEC capable network node, the second list is now be cleared since the data packets to come are protected by another FEC packet to be expected. The FEC capable network node may then forward the received FEC packet towards the client node 804, 904.

If the received packet is a data packet, it is determined whether it is redundant or not. If it is redundant, it may be removed from a list and then discarded. If it is not redundant, its SN is noted and it is forwarded to the client node 804, 904.

This disclosure also comprises a method in a FEC capable, client node 120, for enabling FEC of downlink data. This method comprises receiving from a FEC capable uplink network node a first number of data packets. In addition, the method comprises deciding that a FEC packet comprising a payload for a first number of data packets, shall be considered to be received by the client node from the FEC capable uplink network node, if a certain flag is detected to be present in a header part of any of the first number of data packets, or if a FEC packet having a header part only is received by the client node from the FEC capable uplink network node.

Figure 10:
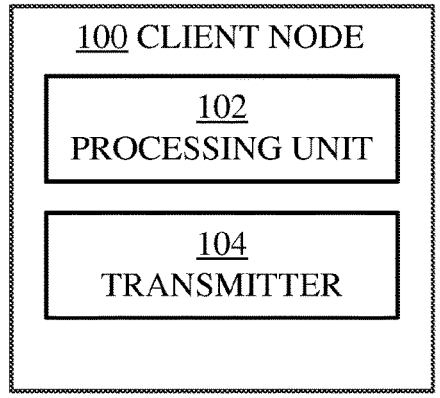
FIG. 10 schematically presents a client node adapted for the uplink, according to exemplary embodiments.

FIG. 10 schematically presents a client node 100 capable of enabling forward error correction of uplink data. The client node 100 comprises a processing unit 102 and a transmitter 104. The processing unit 102 is adapted to generate 30, 206 a number of data packets. The processing unit is also adapted to transmit 32, 208, towards an uplink network node 202, via the transmitter 104, each data as it is generated. The processing unit 102 is further adapted to generate 34, 212 one FEC packet. In addition, the processing unit 102 is also adapted to transmit 36, 214 towards the uplink network node 202, via the transmitter 104, only a header part of the FEC packet.

The processing unit 102 may further be adapted to transmit 36, 214 only the header part of the FEC packet at a point in time after which a configurable number of data packets has been transmitted.

The processing unit 102 may further be adapted to generate a message authentication code (MAC) of the FEC packet based on the payload of the generated number of data packets, and to include the MAC in the header of the FEC packet.

The processing unit 102 may further be adapted to transmit 32, 208, 36, 214 said each data packet and said only a header of the FEC packet, via the transmitter 104 and via a radio access network node towards the uplink network node.

Figure 11:
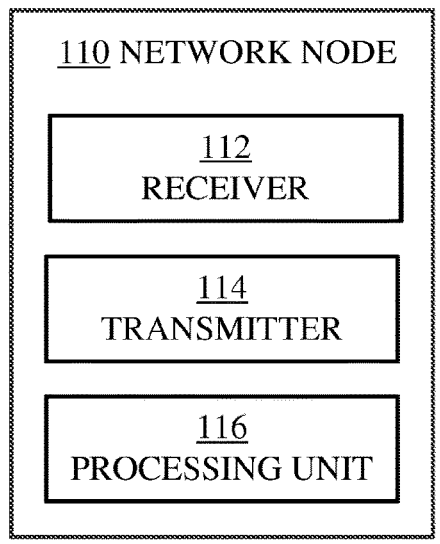
FIG. 11 schematically presents a network node adapted for the uplink and the downlink, according to exemplary embodiments.

FIG. 11 schematically presents a network node 110 capable of performing FEC of uplink data. The network node 110 comprises a receiver 112, a transmitter 114 and a processing unit 116. The processing unit 116 is adapted to receive 40, 208, from a client node 200 via the receiver 112 a number of data packets, and to transmit 41, 210, to an uplink network node 204 via the transmitter 114, the received number of data packets. The network node is also adapted to receive 42, 214, from the client node 200, via the receiver 112, only a header part of a FEC packet. Further, the network node is also adapted to calculate 43, 216 a payload for the FEC packet, based on payload of the number of data packets. The network node is also adapted to append 44, 218 the calculated payload, to the header part of the FEC packet, forming a modified FEC packet. In addition, the network node is also adapted to transmit 45, 220, to the uplink network node, via the transmitter 114, the modified FEC packet.

The processing unit 116 may further be adapted to perform an XOR-operation on the payload of the received number of data packets.

In addition, FIG. 11 also schematically presents a network node 110 capable of enabling FEC of downlink data. The network node 110 comprises a receiver 112, a transmitter 114 and a processing unit 116. The processing unit 116 is adapted to receive 70, 608, from an uplink network node, via the receiver 112, a first number of data packets. The processing unit is also adapted to forward 71, 610, to a client node, via the transmitter 114, the first number of data packets. The processing unit of the network node 110 capable of performing FEC of downlink data, is also adapted to receive 72, 614, from the uplink network node 600, via the receiver 112, a FEC packet having a payload based on a second number of data packets. The processing unit 116 is also adapted to notify 616 the client node 604, via the transmitter 114, that all data packets in the second number of data packets have been received from the uplink network node, if the first number of data packets comprises the same data packets as the second number of data packets. In addition, the processing unit is also adapted to transmit 618, via the transmitter 114, the FEC packet to the client node 604, if the second number of data packets comprises a data packet that is absent in the first number of data packets.

The processing unit 116 may further be adapted to transmit 616 to the client node 604 via the transmitter 114, only a header part of said FEC packet indicating that the data packets of the second number of data packets were received by the FEC capable network node.

The processing unit 116 may further be adapted to notify 616 the client node 604 via the transmitter 114, by a certain flag in a header part of a data packet, which data packet the processing unit 116 is adapted to forward to the client node, the certain flag indicating that the data packets of the second number of data packets were received by the FEC capable network node.

The processing unit 116 may further be adapted to include the certain flag in the header part of one of the data packets of the first number of data packets, which the processing unit is adapted to forward to the client node.

The processing unit 116 further is adapted to receive, from the uplink network node, via the receiver, another data packet, and wherein the processing unit further is adapted to include the certain flag in a header part of said another data packet, and to forward said another data packet, via the transmitter, to the client node.

The processing unit 116 may further be adapted to identify the data packets comprised in the second number of data packets, based on a header part of the received FEC packet.

Figure 12:
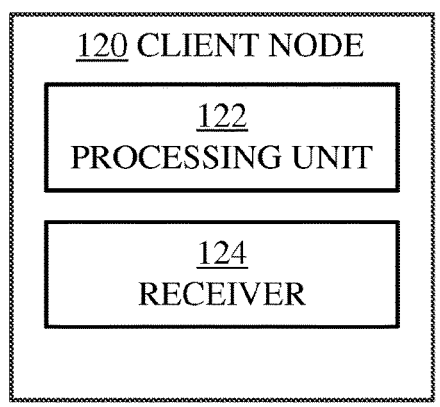
FIG. 12 schematically presents a client node adapted for the downlink, according to exemplary embodiments.

This disclosure also comprises a client node capable of enabling forward error correction of downlink data. FIG. 12 schematically presents such a client node 120. This client node 120 comprises a processing unit 122 and a receiver 124. The processing unit 122 is adapted to receive, from a FEC capable uplink network node, via the receiver 124, a first number of data packets. The processing unit 122 is also adapted to decide that a FEC packet comprising a payload for a first number of data packets, shall be considered to be received by the client node from the FEC capable uplink network node, if a certain flag is detected to be present in a header part of any of the first number of data packets, or if a FEC packet having a header part only is received by the client node from the FEC capable uplink network node.

According to alternative embodiments, forward error correction may be applied per-stream, instead of per-connection, enabling multiplexing several streams into one and the same transport layer connection. In other words, only selected streams will be protected by FEC and the sender may decide which ones.

To be able to allow an intermediate, or proxy, network node to apply FEC per streams in uplink, the sender, i.e. the client node may have to use different sequence number space for all streams. Therefore, an intermediate FEC capable network node may have to save payloads of data packets for multiple FEC groups, i.e. number of data packets protected by the same FEC packet, for multiple streams, or alternatively, maintain several running XOR operations, one for each stream's FEC group.

To be able to allow an intermediate, or proxy, network node to apply FEC per streams in downlink, the intermediate FEC capable network node may have to maintain the sequence number of already received data packets of the different streams, and hence belonging to different FEC groups.

When the FEC capable network node receives a FEC packet, it may have to determine the applicable FEC group, which is feasible based on the sequence number and determine which sequence number space it belongs to.

Embodiments of the present exemplary embodiments have the following advantages:

Radio resources may be saved by avoiding sending FEC information over the radio segments, both in uplink and downlink directions. In the DL, a FEC packet is only sent if it will be useful for the receiver, thereby saving resources. In the UL, only a header part of the FEC packet is sent by the client node, which saves radio resources.

The sender or receiver, i.e. each data stream endpoint, may exclusively decide which data packets/streams to protect with FEC. This is advantageous as the endpoints know the best which data packets are the most important, e.g. most delay sensitive, to protect.

As endpoints may decide to only protect the most important streams, the overall extra traffic is kept low, which is a less aggressive behavior compared to approaches where a FEC encoder and decoder is put into the network and all traffic is protected between them regardless of priority; the delay and throughput penalty of the normal TCP flows competing on the same bottleneck is therefore kept low.

Each endpoint may decide the amount of FEC packets to use, which is an advantageous as the endpoints are aware of the experienced congestion on the whole end-to-end path and may tune an overhead accordingly.

The whole end-to-end path is protected with FEC, not only dedicated segments of the end-to-end path.

The methods as disclosed herein introduce no additional delays in forwarding data packets towards the receivers.

It is also an advantage that only a single network node is needed between the end-points of a connection, said single network node being independent from the endpoints.

It may be further noted that the above described embodiments are only given as examples and should not be limiting to the present exemplary embodiments, since other solutions, uses, objectives, and functions are apparent within the scope of the embodiments as claimed in the accompanying patent claims.

Abbreviations
DL downlink
DTLS datagram transport layer security
FEC forward error correction
LTE long term evolution
MAC message authentication code
MSS maximum segment size
QUIC quick UDP Internet connections
RLC radio link control
RTT round trip time
SCTP stream control transmission protocol
SN sequence number
TCP transmission control protocol
UDP user datagram protocol
UL uplink
XOR exclusive OR

The invention claimed is:

1. A method in a client node for enabling forward error correction, FEC, of uplink data, the method comprising:
generating data packets;
transmitting, towards an uplink network node, each data packet as each data packet is generated,
generating one FEC packet; and
transmitting, towards the uplink network node, only the header part of the
FEC packet, wherein generating the FEC packet comprises:
generating a message authentication code (MAC), of the FEC packet based on a payload of the generated data packets; and
including the MAC in a header of the FEC packet, wherein the MAC included in the header of the FEC packet, is a hash function.

2. The method according to claim 1, wherein transmitting only the header part of the FEC packet comprises transmitting the header part of the FEC packet at a point in time after which a configurable number of data packets have been transmitted.

3. The method according to claim 1, wherein transmitting each data packet and only the header of the FEC packet comprises transmitting each data packet and only the header of the FEC packet via a radio access network node towards the uplink network node.

4. A client node capable of enabling forward error correction, FEC, of uplink data the client node comprising a processing unit and a transmitter, wherein the processing unit is adapted to:
generate data packets;
transmit, towards an uplink network node, via the transmitter, each data packet as each data packet is generated,
generate one FEC packet;
transmit towards the uplink network node, via the transmitter, only the header part of the FEC packet;
generate a message authentication code (MAC) of the FEC packet based on a payload of the generated data packets; and
include the MAC in the header of the FEC packet, wherein the MAC included in the header of the FEC packet is a hash function.

5. The client node according to claim 4, wherein the processing unit is further adapted to transmit only the header part of the FEC packet at a point in time after which a configurable number of data packets have been transmitted.

6. The client node according to claim 4, wherein the processing unit is further adapted to transmit each data packet and only the header of the FEC packet, via the transmitter, via a radio access network node towards the uplink network node.

7. A method in a forward error correction, FEC, capable network node for performing FEC of uplink data, the method comprising:
receiving, from a client node, data packets;
transmitting, to an uplink network node, the received data packets;
receiving, from the client node, only a header part of a FEC packet;
calculating a payload for the FEC packet based on the payload of the received data packets;
appending the calculated payload to the header part of the FEC packet to form a modified FEC packet; and
transmitting, to the uplink network node, the modified FEC packet that includes a message authentication code (MAC) generated based on a payload of a generated data packets at the client node; wherein the MAC included in the header of the FEC packet, is a hash function.

8. The method according to claim 7, wherein calculating the payload for the FEC packet comprises performing a XOR operation on the payload of the received data packets.

9. A network node capable of performing forward error correction, FEC, of uplink data, the network node comprising a receiver, a processing unit, and a transmitter, wherein the processing unit is adapted to:
receive, from a client node, via the receiver, data packets;
transmit, to an uplink network node, via the transmitter, the received data packets;
receive, from the client node, via the receiver, only a header part of a FEC packet;
calculate a payload for the FEC packet based on the payload of the received data packets;
append the calculated payload to the header part of the FEC packet to form a modified FEC packet; and
transmit, to the uplink network node, via the transmitter, the modified FEC packet that includes a message authentication code (MAC) generated based on a payload of a generated data packets at the client node, wherein the MAC included in the header of the FEC packet, is a hash function.

10. The network node according to claim 9, wherein the processing unit is further adapted to perform a XOR operation on the payload of the received data packets.

11. A method in a forward error correction FEC, capable network node for enabling FEC of downlink data the method comprising:
receiving, from an uplink network node, a first number of data packets;
forwarding, to a client node, the first number of data packets;
receiving, from the uplink network node, a FEC packet having a payload based on a second number of data packets;
identifying the data packets comprised in the second number of data packets based on a header part of the received FEC packet that includes a message authentication code (MAC) generated based on a payload of a generated data packets at the client node, wherein the MAC included in the header of the FEC packet, is a hash function;
if the first number of data packets comprises the same data packets as the second number of data packets, notifying the client node that all data packets in the second number of data packets have been received from the uplink network node; and
if the second number of data packets comprises a data packet that is absent from the first number of data packets, transmitting to the client node the FEC packet.

12. The method according to claim 11, wherein notifying the client node comprises transmitting to the client node only a header part of the FEC packet indicating that the data packets of the second number of data packets were received by the FEC-capable network node.

13. The method according to claim 11, wherein notifying the client node comprises notifying the client node with a flag in a header part of a data packet that is forwarded to the client node, the flag indicating that the data packets of the second number of data packets were received by the FEC-capable network node.

14. The method according to claim 13, wherein notifying the client node comprises including the flag in the header part of one of the data packets of the first number of data packets which are forwarded to the client node.

15. The method according to claim 13, comprising receiving, from the uplink network node, another data packet, and wherein notifying the client node comprises including the flag in a header part of another data packet, and forwarding the another data packet to the client node.

16. A network node capable of enabling forward error correction, FEC, of downlink data, the network node comprising a receiver, a processing unit, and a transmitter, wherein the processing unit is adapted to:
receive, from an uplink network node, via the receiver, a first number of data packets;
forward, to a client node, via the transmitter, the first number of data packets;
receive, from the uplink network node, via the receiver, a FEC packet having a payload based on a second number of data packets;
if the first number of data packets comprises the same data packets as the second number of data packets, notify the client node, via the transmitter, that all data packets in the second number of data packets have been received from the uplink network node; and
if the second number of data packets comprises a data packet that is absent from the first number of data packets, transmit, via the transmitter, the FEC packet to the client node; and
identify the data packets comprised in the second number of data packets based on a header part of the received FEC packet that includes a message authentication code (MAC) generated based on a payload of a generated data packets at the client node,
wherein the MAC included in the header of the FEC packet, is a hash function.

17. The network node according to claim 16, wherein the processing unit is further adapted to transmit to the client node, via the transmitter, only a header part of the FEC packet indicating that the data packets of the second number of data packets were received by the FEC capable network node.

18. The network node according to claim 16, wherein the processing unit is further adapted to notify the client node, via the transmitter, with a flag in a header part of a data packet which the processing unit is adapted to forward to the client node, the flag indicating that the data packets of the second number of data packets were received by the FEC-capable network node.

19. The network node according to claim 18, wherein the processing unit is further adapted to include the flag in the header part of one of the data packets of the first number of data packets which the processing unit is adapted to forward to the client node.

20. The network node according to claim 18 wherein the processing unit is further adapted to receive, from the uplink network node, via the receiver, another data packet, and wherein the processing unit is further adapted to include the flag in a header part of the another data packet, and to forward the another data packet, via the transmitter, to the client node.

* * * * *